Feb. 24, 1948.   F. D. JONES ET AL   2,436,475
SIDE DELIVERY RAKE
Filed Oct. 13, 1943   2 Sheets-Sheet 1

INVENTORS
FRANK D. JONES
MILES H. TUFT
ATTORNEYS

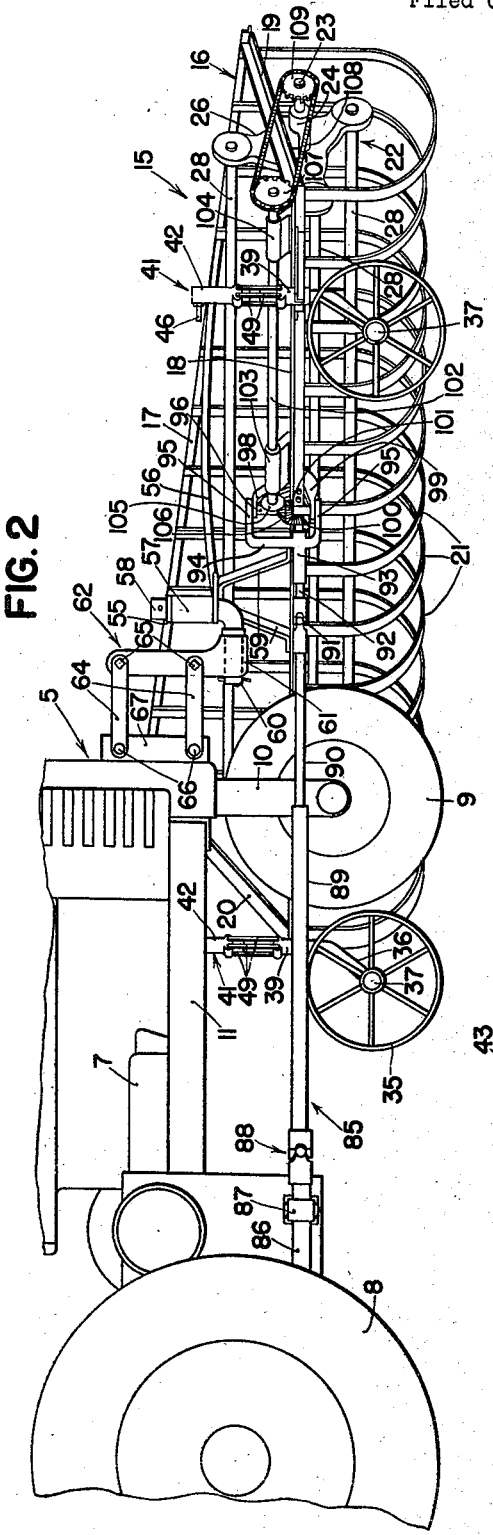

Patented Feb. 24, 1948

2,436,475

UNITED STATES PATENT OFFICE 2,436,475

SIDE DELIVERY RAKE

Frank D. Jones and Miles H. Tuft, Ottumwa, Iowa, assignors to Deere Manufacturing Co., a corporation of Iowa Application October 13, 1943, Serial No. 506,110

19 Claims. (Cl. 56—377)

The present invention relates generally to implements of the type adapted to be mounted on the front end of a tractor and supported thereby, either wholly or partially, and is particularly applicable to a side delivery rake. It is understood, however, that the invention is not limited exclusively to side delivery rakes, but may be adapted to other types of implements as well. The principal object of the present invention relates to the provision of novel and improved means for connecting and supporting an implement ahead of the tractor. A further object relates to the provision of a novel power transmitting connection between the implement and the tractor engine. Specifically, it is another object of the present invention to provide a draft connection between a tractor and an implement ahead of the latter, providing for vertical shifting movement of the implement as the latter moves over the ground, but preventing lateral displacement of the implement relative to the tractor. Still another object relates to the provision of means for gauging the height of the implement relative to the ground and for easily controlling the gauging means.

We are aware that side delivery rakes have heretofore been connected ahead of tractors in a diagonally disposed position, by means which may have been satisfactory for normal straight ahead operation or turning movement in one direction, but because of the diagonal position of the rake relative to the direction of advance, such rakes have heretofore been incapable of performing any appreciable amount of work when making a turn in the opposite direction. Therefore, a further object of our invention relates to the provision of a side delivery rake or other normally diagonally disposed implement, which can be made to perform its work during a turn in either direction. It is obvious to those skilled in the art that the rake operates satisfactorily when a turn is made in a direction generally perpendicular to the axis of rotation of the rake reel, but when the rake is turned in the opposite direction, the rake reel is moved axially and therefore it does not move a swath of any appreciable width. A more specific object of our invention, therefore, is concerned with the provision of a side delivery rake or other like implement, together with means for shifting the implement from a diagonally disposed position at one side of the tractor to an oppositely diagonally disposed position at the other side of the tractor in order to provide for efficient operation while the tractor and rake are making a turn in either direction. A further object has to do with the provision for adjustably setting the rake reel at various angles to the line of advance to enable the rake to be operated in a position more nearly perpendicular to the line of advance to rake a wider swath when the crop is comparatively light.

Still another object of this invention relates to the provision of flexible power transmitting means which will transmit power from the tractor to the implement, regardless of the position of the latter, either during forward operation or during a turn in either direction.

These and other objects and advantages of our invention will be apparent to those skilled in the art after a consideration of the following description in which reference is had to the drawings appended hereto, in which Figure 1 is a plan view of the forward end of the tractor and a side delivery rake mounted thereon and embodying the principles of the present invention, and also showing in dotted lines, the other operating position of the rake relative to the tractor.

Figure 2 is a side elevational view of the tractor and implement as viewed from the right side of the tractor.

Figure 3 is a fragmentary side elevational view taken along a line 3—3 in Figure 1 and showing the means for adjusting the position of the rake frame; and Figure 4 is a side elevational view of one of the supporting caster wheels, showing the means for adjusting the rake frame vertically relative to the ground.

Figure 1:
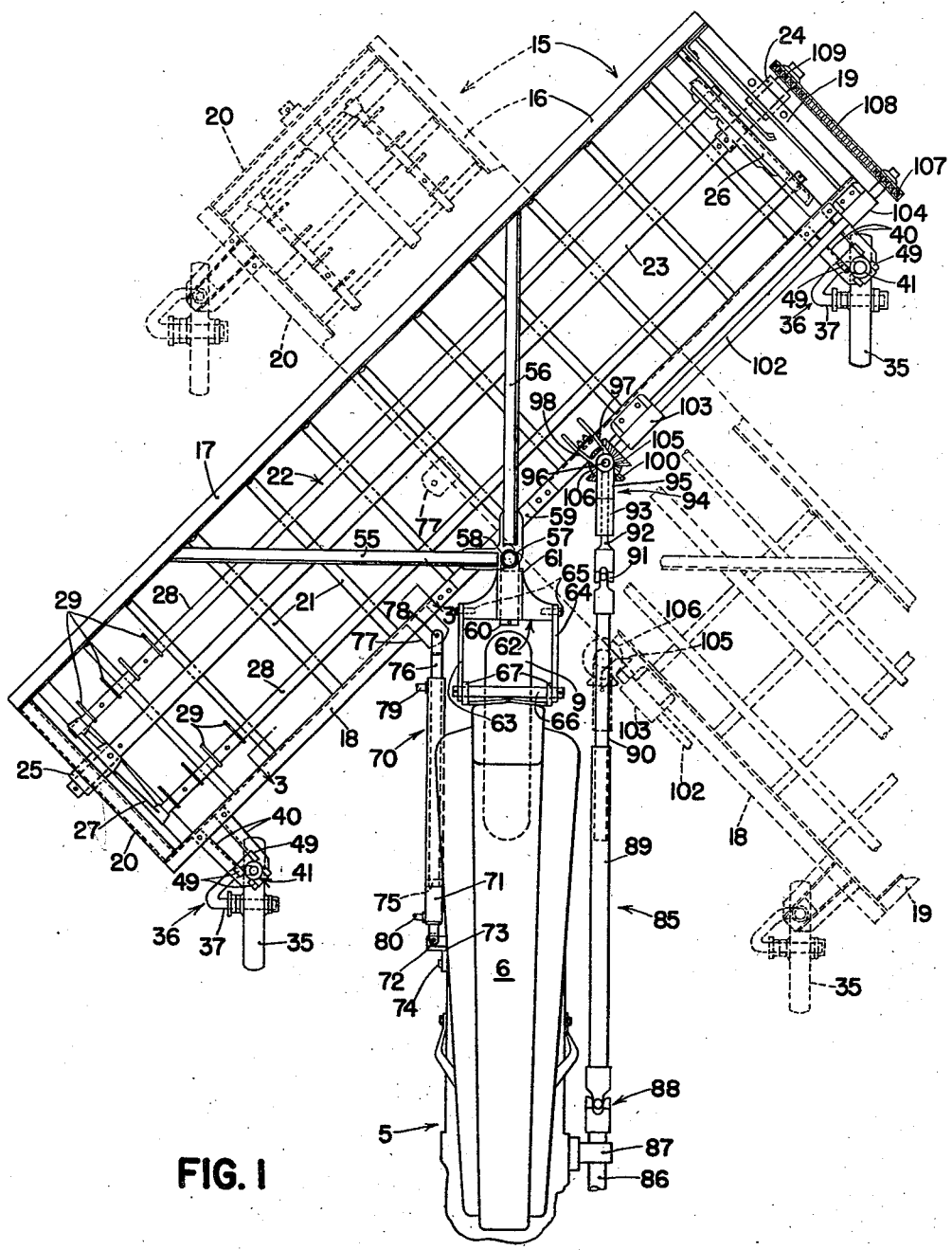

Referring now to the drawings, the tractor is indicated in its entirety by reference numeral 5 and comprises a narrow longitudinally extending body 6 on which is mounted an engine 7. The tractor 5 is of the conventional tricycle type, having a pair of laterally spaced rear traction wheels 8 and a single front dirigible wheel 9 carried on a dirigible steering fork 10. The steering fork 10 is mounted for rotation about a vertical axis, at the forward end of the main body frame members 11, which extend forwardly from the engine 7 in laterally spaced arrangement.

The side delivery rake is indicated in its entirety by reference numeral 15 and comprises a rake frame 16 including a pair of fore and aft spaced longitudinal frame members 17, 18 interconnected by a pair of end frame members 19, 20 and a plurality of U-shaped stripper members 21. A rake reel 22 is mounted within the rake frame 16 and includes a shaft 23 extending longitudinally of the frame 16 and journaled in bearings 24, 25 carried on the end frame members 19, 20, respectively. The reel 22 also includes a pair of spiders 26, 27 rigidly fixed at opposite ends of the shaft 23, respectively. A plurality of tine supporting shafts 28 is disposed parallel to the reel shaft 23 and journaled at opposite ends, respectively, in the spiders 26, 27. The spider 26 comprises a housing for a set of planetary gears (not shown) of conventional design adapted for rotating the tine supporting shafts 28 in a manner well-known to those skilled in the art, for the purpose of controlling the angle at which the tines 29 engage and withdraw from the crops.

Inasmuch as the rake itself is of conventional design and is well-known to those skilled in the art, no further detailed description is deemed necessary.

The rear end of the rake frame 16 is supported on a pair of laterally spaced caster wheels 35, each of which is journaled on a castering supporting spindle 36 having a generally horizontal axle portion 37 on which the wheel 35 is journaled, the spindle extending upwardly from the axle portion 37 and is inclined forwardly and inwardly toward the wheel 35, terminating in a vertical portion 38 above the rim of the wheel and ahead of the axis of revolution of the latter, by virtue of which the wheel is self aligning in the direction of movement of the rake frame. The vertical portion 38 of the spindle is journaled in a vertically disposed supporting sleeve 39, which is rigidly mounted on a bifurcated horizontal bracket 40, fixed to the rear transverse frame member 18 of the rake frame 16 and extending generally rearwardly therefrom. The vertical spindle 38 is thus rotatable within the sleeve 39 and is also slidable vertically therein, thus providing for vertical shifting movement of the rake frame 16 and sleeves 39 which are rigid therewith, relative to the caster wheel 35 and therefore relative to the ground. The rake frame 16 is raised and lowered by means of a pair of hydraulic lifting mechanisms 41, each comprising a hydraulic cylinder 42, within which is slidably disposed a hydraulic piston member 43. The piston 43 is mounted on a vertical piston rod 44, which extends downwardly from the cylinder 42 and is coupled to the upper end of the spindle 38 by means of a suitable coupling 45. Each cylinder is provided with a flexible hose connection 46, through which oil or other fluid such as compressed air or the like is applied under pressure to raise the cylinder member 42 relative to the piston 43. The lower end of the cylinder 42 is provided with a pair of lugs 47, which are connected to suitable aligned lugs 48 on the sleeve member 39 by means of vertically disposed links 49. Thus, when oil is supplied through the hydraulic cylinder, the cylinder 42 moves upwardly relative to the piston 43 and lifts the rake frame through the links 49, sleeve 39, and bracket 40. The rake frame can be lowered by exhausting a portion of the fluid from the cylinder, whereby the weight of the frame forces the fluid to return to the control mechanism (not shown). Any suitable type of control mechanism can be used and since the present invention has nothing to do directly with the details of this mechanism, it is omitted for the sake of simplicity. Preferably, the control mechanism includes means for independent control of the cylinders at the opposite ends of the rake frame, for the purpose of leveling the frame in a transverse direction if desired.

The front of the rake frame 16 is carried by a pair of supporting members 55, 56 attached to the forward transverse frame member 17 at laterally spaced points and extending rearwardly therefrom in converging relation. The rear ends of the supporting members 55, 56 are rigidly attached to a vertical sleeve member 57, which is journaled on a vertically disposed spindle 58 supported on the forward end of the tractor 5 by means which will be described. A bifurcated standard 59 is also rigidly fixed to the sleeve member 57 and brace 56 and is fixed at its lower end on the rear transverse member 18 of the rake frame 16.

The spindle 58 has a rearwardly turned supporting portion 60, which is journaled for movement about a fore and aft extending axis in a suitable bearing portion 61 formed in the lower end of a supporting member in the form of a vertically disposed bracket casting 62, which is supported on the forward end of the tractor by means of two laterally spaced pairs of upper and lower generally horizontal parallel links 63, 64. The forward ends of the links are pivotally connected to the supporting casting 62 by means of pivot bolts 65 while the rear ends of the links 63, 64 are journaled on a pair of transversely disposed vertically spaced pins 66 supported in a channel shaped bracket 67 which is rigidly fixed to the front of the tractor 5. It will be evident that by the supporting means described above, the reel frame is mounted on the forward end of the tractor by flexible connecting means providing for vertical shifting movement of the frame relative to the tractor as the rake moves along the ground on its caster wheels 35, and is free to tilt laterally about the horizontal axis of the spindle member 60. The rake is held by the laterally spaced parallel links 63, 64 against lateral shifting movement relative to the tractor, but is free to pivot around the vertical axis of the spindle 58 to swing the entire rake frame 16 from a diagonally disposed position at one side of the tractor, such as is illustrated in solid lines in Figure 1, to a diagonally disposed position at the other side of the tractor, as illustrated in dotted lines in Figure 1.

The rake is shifted from one of said positions to the other by means of a hydraulic device indicated generally by reference numeral 70, comprising a double acting cylinder 71, the rear end of which is pivotally connected by a bolt 72 to a bracket 73, providing for lateral swinging movement about the bolt 72. The bracket 73 is pivotally connected by a bolt 74 to the side frame member 11 of the tractor and is swingable vertically about the transverse axis of the bolt 74 to accommodate the vertical movements of the rake frame during operation. A hydraulic piston 75 is slidable within the cylinder 71 and is connected by a piston rod 76 to a bracket 77 rigidly fixed to the rear transverse frame member 18 and extending rearwardly therefrom. A pivot bolt 78 connects the piston rod 76 to the bracket 77 and is vertically disposed to accommodate lateral swinging movement as the rake frame pivots about the vertical axis of the spindle 58. The cylinder 71 is provided with a pair of hydraulic hose connections 79, 80 at opposite ends of the cylinder, respectively, to provide for power actuation of the cylinder in both directions whereby the rake frame can be shifted by hydraulic control from either side of the tractor to the other. Any suitable conventional hydraulic valve mechanism can be used for supplying fluid under pressure through the rear hose connection 80 and exhausting fluid from the forward connection 79 for swinging the rake frame in a clockwise direction as viewed in Figure 1 about the vertical axis of the spindle 58 from the position indicated in solid lines to the position indicated in dotted lines. By reversing the direction of fluid pressure and applying pressure to the hose connection 79 the rake frame can be shifted in a counterclockwise direction back to the position shown in solid lines, during which operation the fluid is exhausted through the hose connection 80.

With the rake shown in the solid line position, it is evident that during operation a windrow is laid at the left side of the tractor and it is obvious that a left turn can be made, during which the rake will continue to rake a substantially normal swath. However, should it be necesssary to make a right turn, it is evident that the rake in such case would be moved substantially parallel to its axis of rotation and therefore would not rake a normal swath during a right turn unless the rake frame were shifted by the hydraulic cylinder 70 to the oppositely disposed diagonal position indicated in dotted lines. A rake of this type is also convenient in case it is desired to make a double-sized windrow. This is accomplished by making one circuit of the field with the rake frame in one of the positions and on the second circuit of the field the rake is shifted in the opposite direction to lay the second windrow alongside the windrow first formed.

This type of rake also permits a field to be raked by shuttling back and forth across the field instead of making the usual circuits around the field, and still space the windrows apart in the conventional manner. This is accomplished by raking across the field with the rake in one position and then reversing the position of the rake for the return trip across the field. Other uses of a rake of this type may now be apparent to those skilled in the art. Obviously, it is possible to shift the rake about its vertical supporting axis by other means than the double acting hydraulic cylinder illustrated herein. Intermediate positions of the rake can be obtained by interrupting the movement of the piston intermediate the ends of the cylinder, thus permitting the rake to operate in positions more nearly perpendicular to the direction of travel for raking a wider swath when the crop is comparatively light and thin. The width of the swath is proportional to the sine of the angle between the reel axis and the line of advance.

The rake reel is rotated by power transmitted from the tractor engine by means of a flexible power shaft extending forwardly along the side of the tractor and indicated in its entirety by reference numeral 85. The power shaft 85 comprises a rear shaft section 86 journaled in suitable bearings 87 mounted on the tractor and connected at its rear end by any conventional means (not shown) to the power take-off shaft at the rear of the tractor. The shaft section 86 is connected through a universal joint 88 to a pair of telescoping shaft sections 89, 90 of square cross section or any other suitable conformation which permits relative longitudinal movement but prevents relative rotation between the shaft sections 89, 90. The forward end of the shaft section 90 is connected through a universal joint 91 to a shaft section 92, which is journaled in a sleeve bearing 93 which is formed integrally with a bracket 94, the latter having a pair of forwardly extending vertically spaced arms 95, for supporting therebetween a vertical shaft 96 journaled at upper and lower ends in the vertically spaced arms 95, respectively. The bracket 94 is supported on a second U-shaped bracket 97, which is mounted on the rear transverse rake frame member 18 and is provided with a pair of upper and lower rearwardly extending arms 98, 99, which are adapted to be journaled on the vertical shaft 96 between the arms 95 of the bracket 94.

The forward shaft section 92 is adapted to transmit power to the vertical shaft 96 through a pair of intermeshing bevel gears 100, 101, which are fixed to the forward end of the shaft 92 and to the intermediate portion of the shaft 96, respectively. A drive shaft 102 is disposed generally parallel to the reel frame and is journaled in a pair of laterally spaced bearings 103, 104, which are mounted on suitable brackets and attached to the rear frame member 18. The inner end of the shaft 102 is provided with a bevel gear 105 which meshes with a cooperative bevel gear 106 fixed to the vertical shaft 96. The outer end of the drive shaft 102 carries a sprocket 107, which is connected by a flexible power transmitting chain 108 to a sprocket 109 which is fixed to the extended end of the reel shaft 23.

It is evident in Figure 1 that there is no interruption of power transmitted to the rake reel during the shifting movement of the rake about the vertical axis of the spindle 58, and furthermore there is no difficulty encountered due to the changing angle between the drive shaft 102 and the power shaft 85. Although the shaft 85 must swing slightly to the right as the shaft 96 moves in an arc about the axis of the spindle 58, the two positions of the vertical shaft 96 are substantially in a common fore and aft extending vertical plane, while the telescoping shaft sections 89, 90 accommodate the difference in length of the power transmitting shaft 85. The universal joints 88, 91 accommodate the lateral swinging of the shaft 85 during shifting movement of the rake frame and also accommodate vertical shifting movement of the rake frame on the links 63, 64 as the frame floats along the ground.

We do not intend our invention to be limited to the exact details shown and described herein, except as limited by the claims which follow.

We claim:

1. A side delivery rake comprising a tractor having a narrow longitudinally extending body supported on a dirigible wheel beneath the forward end thereof, a rake frame disposed in front of said tractor, means for mounting said frame on the forward end of said tractor including a pair of vertically spaced parallel links swingably connected to the forward end of said tractor and extending forwardly therefrom and a supporting member mounted on the forward ends of said links and having bearing means connected with said frame providing for horizontal swinging movement from a diagonally disposed normal operating position extending along one side of said tractor wheel and across the path of the latter to an opposite diagonally disposed position extending along the other side of said tractor wheel and across the path of the latter, a rake reel rotatively mounted in said frame, means receiving power from the tractor engine and flexibly connected with said reel for driving the latter in either of said positions of the rake, and means under control of the tractor operator for swinging said rake frame from either of said positions to the other to place said rake in an effective crop moving position to rake a swath in the path of said wheel when making a turn in either direction.

2. A side delivery rake comprising a tractor having a narrow longitudinally extending body supported on a dirigible wheel beneath the forward end thereof, a rake frame disposed in front of said tractor, flexible connecting means for mounting said frame on the forward end of said tractor including a pair of vertically spaced parallel links swingably connected to the forward end of said tractor and extending forwardly therefrom and a supporting member mounted on the forward ends of said links and having bearing means connected with said frame providing for horizontal swinging movement from a diagonally disposed normal operating position extending along one side of said tractor wheel and across the path of the latter to an opposite diagonally disposed position extending along the other side of said tractor wheel and across the path of the latter, said mounting means also providing for vertical shifting movement of said rake frame relative to said tractor but preventing lateral shifting movement during operation, and means under control of the tractor operator for raising and lowering said rake relative to said tractor.

3. A side delivery rake comprising a tractor having a narrow longitudinally extending body supported on a dirigible wheel beneath the forward end thereof, a rake frame disposed in front of said tractor, flexible connecting means for mounting said frame on the forward end of said tractor including a pair of vertically spaced parallel links swingably connected to the forward end of said tractor and extending forwardly therefrom and a supporting member mounted on the forward ends of said links and having bearing means connected with said frame providing for horizontal swinging movement from a diagonally disposed normal operating position at one side of said tractor wheel and across the path of the latter to an opposite diagonally disposed position at the other side of said tractor wheel and across the path of the latter, a rake reel rotatively mounted in said frame, means receiving power from the tractor engine and flexibly connected with said reel for driving the latter in either of said positions of the rake, and a hydraulic cylinder and piston connected between said rake frame and said tractor for swinging said rake frame from one of said positions to the other to place said rake in an effective crop moving position to rake a swath in the path of said wheel when making a turn in one direction.

4. A side delivery rake comprising a tractor, a rake frame disposed in front of said tractor, means for pivotally mounting said frame on the forward end of said tractor providing for horizontal swinging movement from a diagonally disposed normal operating position at one side of said tractor to an opposite diagonally disposed position at the other side of said tractor, said mounting means comprising a pivot member pivotally connected to said rake frame and a pair of vertically spaced parallel links connecting said pivot member to said tractor providing for vertical shifting movement of said rake frame relative to said tractor, a rake reel rotatively mounted in said frame, means receiving power from the tractor engine and flexibly connected with said reel for driving the latter in either of said positions of the rake, a power unit operatively connected between said tractor and said frame for shifting the latter from one of said positions to the other to place said rake in an effective crop moving position when making a turn in either direction, and power actuated means associated with said rake frame for raising and lowering the latter relative to the tractor.

5. The combination set forth in claim 4, including the further provision of a caster wheel for supporting said rake frame, said raising and lowering means comprising a piston and cylinder connected between said wheel and said frame to raise the latter upon said wheel, said parallel links being adapted to restrain said frame from tilting about a transverse axis.

6. A tractor mounted harvesting machine comprising a frame, a supporting member swingably connected to said frame providing for movement of the latter about a vertical axis, and a pair of vertically spaced parallel links connected to said supporting member for mounting said supporting member on a tractor providing for vertical shifting movement but preventing tilting movement of said supporting member.

7. A tractor mounted harvesting machine comprising a frame, a supporting member swingably connected to said frame providing for movement of the latter about a vertical axis, and a pair of vertically spaced parallel links connected to and extending rearwardly from said supporting member and adapted for connection to the front end of a tractor to position said frame ahead of the latter, providing for vertical shifting movement but preventing tilting movement of said supporting member.

8. A tractor mounted harvesting machine comprising a frame, a supporting member swingably connected to said frame providing for movement of the latter about a vertical axis, and two laterally spaced pairs of vertically spaced parallel links swingably connected to said supporting member and extending rearwardly therefrom, the rear ends of said links being adapted for connection to the forward end of a tractor.

9. In combination with a tractor, a side delivery rake comprising a frame disposed ahead of said tractor, means pivotally connecting said frame to the forward end of said tractor providing for horizontal swinging movement from a diagonal position at one side of the tractor to a diagonally oppositely disposed position at the other side of said tractor, a rake reel mounted on said frame, a drive shaft journaled on said frame and connected to drive said reel, a vertical shaft mounted on said frame offset from said pivotal connecting means, a flexible power shaft, comprising a pair of telescoping sections extending from the rear end of said tractor alongside the latter and having a drive connection with the tractor engine, bevel gear means mounted on said vertical shaft, and bevel gears mounted on said power shaft and said drive shaft, respectively, and adapted to mesh with said bevel gear means in either position of said frame.

10. In combination with a tractor, a side delivery rake comprising a frame disposed ahead of said tractor, means pivotally connecting said frame to the forward end of said tractor providing for horizontal swinging movement from a diagonal position at one side of the tractor to a diagonally oppositely disposed position at the other side of said tractor, a rake reel mounted on said frame, a drive shaft journaled on said frame and connected to drive said reel, a vertical shaft mounted on said frame offset from said pivotal connecting means, a flexible power shaft comprising a pair of telescoping sections extending from the rear end of said tractor alongside the latter and having a drive connection with the tractor engine, a supporting member for said power shaft swingably mounted on said rake frame for movement about the axis of rotation of said vertical shaft, bevel gear means mounted on said vertical shaft, and bevel gears mounted on said power shaft and said drive shaft, respectively, and adapted to mesh with said bevel gear means in either position of said frame.

11. In combination with a tractor, an implement comprising a frame disposed diagonally in front of and at one side of said tractor, means pivotally connecting said frame to the front end of said tractor providing for horizontal swinging movement to a diagonal position in front of and at the other side of the tractor, means under the control of the tractor operator for swinging said frame from one side to the other, a rotary device mounted on said frame, a drive shaft journaled on said frame and connected to drive said device, a vertical shaft mounted on said frame offset from said pivotal connecting means, a flexible extensible power shaft extending forwardly from the rear end of said tractor along said tractor and having a drive connection with the tractor engine, a supporting member for the forward end of said power shaft, said member being swingably mounted on said frame for movement about the axis of said vertical shaft, bevel gear means mounted on said vertical shaft, and bevel gears mounted on said power shaft and said drive shaft, respectively, and adapted to mesh with said bevel gear means in either position of said frame.

12. A harvesting machine comprising a frame, a spindle member swingably connected to said frame by means providing for relative movement about a vertical axis, a bracket member pivotally connected to said spindle member by means providing for relative movement about a horizontal axis, and means for mounting said bracket member on a tractor, said mounting means being so constructed and arranged that said bracket member is shiftable vertically relative to the tractor while relative lateral shifting movement is restrained.

13. A tractor mounted side delivery rake comprising a tractor having a narrow longitudinally extending body supported on a dirigible wheel beneath the forward end thereof, a rake frame disposed in front of said tractor, means for mounting said frame on the forward end of said tractor including a pair of vertically spaced parallel links swingably connected to the forward end of said tractor and extending forwardly therefrom and a supporting member mounted on the forward ends of said links and having bearing means connected with said frame providing for horizontal swinging movement from a diagonally disposed normal operating position extending along one side of said tractor wheel and across the path of the latter to an opposite diagonally disposed position extending along the other side of said tractor wheel and across the path of the latter, a rake mounted on said frame, and means under control of the tractor operator for swinging said rake frame from either of said positions to the other to place said rake in an effective crop moving position to rake a swath in the path of said wheel when making a turn in either direction.

14. A tractor mounted side delivery rake comprising a tractor having a narrow longitudinally extending body supported on a dirigible wheel beneath the forward end thereof, a rake frame disposed in front of said tractor, means for mounting said frame on the forward end of said tractor including a pair of vertically spaced parallel links swingably connected to the forward end of said tractor and extending forwardly therefrom and a supporting member mounted on the forward ends of said links and having bearing means connected with said frame providing for horizontal swinging movement from a diagonally disposed normal operating position extending along one side of said tractor wheel and across the path of the latter to an opposite diagonally disposed position extending along the other side of said tractor wheel and across the path of the latter, said mounting means being so constructed and arranged as to provide for lateral tilting movement of said rake frame about a fore and aft extending axis and for vertical shifting movement relative to said tractor while restraining said frame from lateral shifting movement during operation, and means under control of the tractor operator for swinging said rake frame from either of said positions to the other to place said rake in an effective crop moving position to rake a swath in the path of said wheel when making a turn in either direction.

15. A tractor mounted side delivery rake comprising a tractor having a narrow longitudinally extending body supported on a dirigible wheel beneath the forward end thereof, a rake frame disposed in front of said tractor, means for pivotally mounting said frame on the forward end of said tractor comprising a spindle member swingably connected to said frame by means providing for relative movement about a vertical axis, a bracket member pivotally connected to said spindle member by means providing for relative movement about a horizontal axis, and means for mounting said bracket member on said tractor, said mounting means being so constructed and arranged that said bracket is shiftable vertically relative to the tractor while relative lateral shifting movement is restrained.

16. The combination set forth in claim 15 including the further provision that said mounting means comprises laterally spaced links connected at their forward ends to said bracket member and at their rear ends to said tractor.

17. A harvesting machine comprising a frame, a spindle member swingably connected to said frame by means providing for relative movement about a vertical axis, a bracket member pivotally connected to said spindle member by means providing for relative movement about a fore and aft extending generally horizontal axis, and means for mounting said bracket member on a tractor, said mounting means being so constructed and arranged that said bracket member is shiftable vertically relative to the tractor while relative lateral shifting movement is restrained.

18. The combination set forth in claim 17, including the further provision that said spindle member is L-shaped and is journaled in suitable bearings on said frame and said bracket member, respectively.

19. The combination set forth in claim 17, including the further provision that said mounting means comprises two laterally spaced pairs of vertically spaced parallel links extending rearwardly from said bracket member.

FRANK D. JONES.
MILES H. TUFT.

REFERENCES CITED

The following references are of record in the file of this patent:

UNITED STATES PATENTS

| Number | Name | Date |
|---|---|---|
| 888,546 | Sperry | May 26, 1908 |
| 1,233,840 | Burgess | July 17, 1917 |
| 1,728,301 | Murphy | Sept 17, 1929 |
| 2,222,840 | Holmes | Nov. 26, 1940 |
| 2,255,288 | Jones et al. | Sept. 9, 1941 |

FOREIGN PATENTS

| Number | Country | Date |
|---|---|---|
| 59,303 | Switzerland | July 15, 1911 |
| 278,803 | Germany | Oct. 6, 1914 |
| 320,918 | Germany | May 12, 1920 |
| 244,044 | Great Britain | Dec. 10, 1925 |